US006283638B1

(12) United States Patent
Feuer, Jr. et al.

(10) Patent No.: US 6,283,638 B1
(45) Date of Patent: Sep. 4, 2001

(54) SLIP RING WITH INTEGRAL BEARING ASSEMBLY AND METHOD OF MANUFACTURE

(75) Inventors: Henry O. Feuer, Jr., Roanoke; Donald L. Grissom, Dublin; Thomas H. Beeken, Shawsville, all of VA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/484,202

(22) Filed: Jan. 18, 2000

Related U.S. Application Data

(62) Division of application No. 09/126,733, filed on Jul. 31, 1998, now Pat. No. 6,049,967.

(51) Int. Cl.[7] .............................. F16C 19/08; H01R 39/08
(52) U.S. Cl. .............................................. 384/537; 310/232
(58) Field of Search ..................................... 384/537, 585, 384/428, 441; 310/232

(56) References Cited

U.S. PATENT DOCUMENTS

| | | |
|---|---|---|
| 2,322,011 | 6/1943 | French . |
| 2,551,030 | 5/1951 | Madden . |
| 2,786,985 | 3/1957 | Meretey . |
| 2,854,647 * | 9/1958 | Nugent ................................. 310/232 |
| 3,289,140 | 11/1966 | Slack . |
| 4,684,179 | 8/1987 | Freeman . |
| 4,837,920 | 6/1989 | Sweet et al. . |
| 4,848,938 * | 7/1989 | Haas et al. ........................... 384/537 |
| 5,054,189 | 10/1991 | Bowman et al. . |

FOREIGN PATENT DOCUMENTS

| | | |
|---|---|---|
| 1926219 | 11/1970 | (DE) . |
| 0618648A | 10/1994 | (EP) . |
| 707629 | 4/1954 | (GB) . |

* cited by examiner

*Primary Examiner*—Lenard A. Footland
(74) *Attorney, Agent, or Firm*—Lowe Hauptman Gilman & Berner, LLP

(57) ABSTRACT

These and other objects of the present invention are achieved by inserting electrically conductive rings and a bearing into a mold before a slip ring body is injection molded. During the injection molding process, the rings and the bearing are partially encapsulated by the injected plastic and retained. Plastic is prevented from entering the race of the bearing by using a pair of additional plastic inserts which prevent plastic from entering the bearing race. When the injected plastic cools, the plastic shrinks and compresses the bearing thereby preventing axial movement. Wires attached to the rings are also encapsulated by the plastic material during the injection molding process.

8 Claims, 4 Drawing Sheets

SLIP RING WITH INTEGRAL BEARING ASSEMBLY AND METHOD OF MANUFACTURE

This application is a Divisional of application Ser. No. 09/126,733 filed Jul. 31, 1998, now U.S. Pat. No. 6,049,967.

FIELD OF THE INVENTION

The present invention relates generally to a method of manufacturing an electrical slip ring assembly, and more particularly, the present invention is directed to a slip ring having an integral bearing used in an electrical slip ring assembly.

BACKGROUND OF THE INVENTION

A prior art capsule assembly 10 is depicted in FIG. 1. The capsule assembly 10 includes a slip ring 12, a pair of semi-circular brush blocks 14 and a cylindrical housing 16. The capsule assembly 10 is formed by placing the pair of brush blocks 14 around the slip ring 12 and then the assembly of the brush blocks 14 and the slip ring 12 are placed within the housing 16.

The slip ring 12 has a body formed from two separate members including a ring and lead member 18 (rings 24 and leads 34) joined to a backshaft member 20. The slip ring 12 includes an elongated cylindrical ring portion. Positioning the ring members 18 are radially extending portions 26 made of an electrically non-conductive material which separate the electrically conductive rings 24. Each of the brush blocks 14 has a plurality of brushes 28 which are each in mechanical contact with a corresponding ring 24. A front bearing 30 is mounted on the slip ring member 12 and a backshaft bearing 32 is mounted to the backshaft member 20.

The backshaft member 20 extends outwardly from the housing 16. The backshaft member 20 is grasped and rotated by another component (not shown). The slip ring 12 rotates within the brush blocks 14 and the brushes 28 from brush blocks 14 contact the rings 24 on slip ring 12 so that signals to/from the rotating slip ring 12 can be communicated to/from stationary brush blocks 14 in a known manner.

As depicted in FIGS. 1 and 2, the backshaft bearing 32 has one side thereof in contact with a front flange 36 formed on backshaft member 20. The opposite side of backshaft bearing 32 is retained by a standard retainer such as a retaining clip 38 or the like. The retaining clip 38 has its inner periphery positioned in a groove (not shown) on back shaft member 20 and depending on manufacturing tolerances, the backshaft bearing 32 may not be fully restrained in an axial (longitudinal) direction or may be too tightly retained resulting in stress on the bearing. The disadvantage is that there is some play allowing the back shaft bearing 32 to move back and forth in an axial direction.

Further, the backshaft member 20 and ring member 18 must not rotate relative to each other. The backshaft member 20 and the ring member each have mating hexagonal portions. As depicted in FIG. 3, backshaft member 20 has a female hexagonal portion 42 which mates with a male hexagonal portion 40 on ring member 18. The disadvantage is that this two piece construction is time consuming and expensive because two parts must be injection molded. An additional disadvantage is that the wires 34 must be potted to seal the wires 34 to the backshaft member 20 resulting in additional cost.

SUMMARY OF THE INVENTION

It is, therefore, an object of the invention to provide a method for manufacturing a slip ring with an integral bearing.

It is another object of the present invention to provide a slip ring with a back shaft bearing in which axial movement of the back shaft bearing is prevented or minimized.

It is yet another object of the present invention to provide a slip ring having a one-piece body.

It is another object of the present invention to encapsulate wires attached to the rings with in the slip ring body and eliminate potting of the wires.

It is yet a further object of the present invention to provide a slip ring which is cost effective to produce and reliable in operation.

These and other objects of the present invention are achieved by inserting electrically conductive rings and a bearing into a mold before a slip ring body is injection molded. During the injection molding process, the rings and the bearing are partially encapsulated by the injected plastic and retained. Plastic is prevented from entering the race of the bearing by using a pair of additional plastic inserts which prevent plastic from entering the bearing race. When the injected plastic cools, the plastic shrinks and compresses the bearing thereby preventing axial movement. Wires attached to the rings are also encapsulated by the plastic material during the injection molding process.

The foregoing objects are also achieved by a method of assembling a slip ring with an integral bearing. The bearing is placed in a mold. Rings are placed in a mold. A slip ring body is molded while mold material is prevented from entering the race of the bearing.

The foregoing objects are also achieved by a method of assembling a slip ring with an integral bearing. A pair of inserts are formed. A plurality of rings are secured between the pair of inserts. One or more wires are attached to each of the rings with one end of each wire extending beyond the pair of inserts. A bearing is placed between the pair of inserts. The thus assembled inserts, rings, wires and bearing form an assembly. The assembly is then inserted into a mold. A slip ring body is molded in the mold. During the molding step, the rings, the wires and the bearing are captured to form the slip ring with integral bearing.

The foregoing objects are also achieved by an integral slip ring. The slip ring includes slip ring body having a slip ring section, a backshaft section and a bearing mounting section therebetween. The bearing is mounted in the bearing mounting section wherein the slip ring body has opposed bearing retaining walls which capture the bearing and prevent axial movement of the bearing.

Still other objects and advantages of the present invention will become readily apparent to those skilled in the art from following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 5:
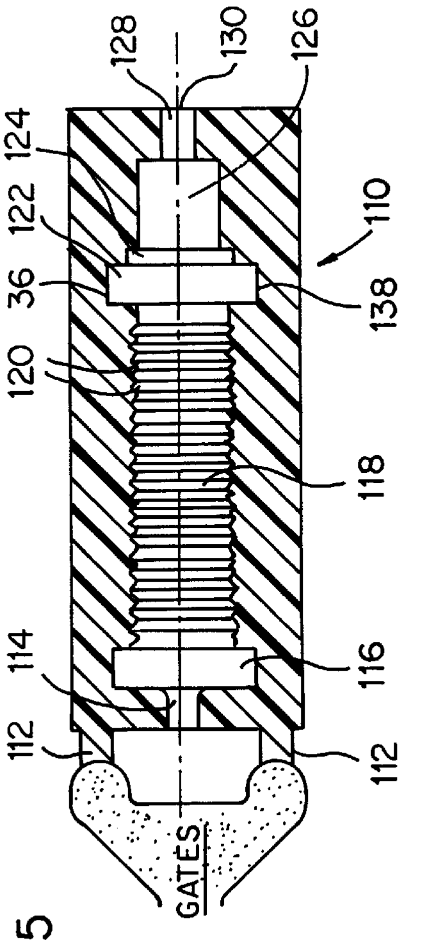
FIG. 5 is a top plan view of an insert molded according to the present invention.
Figure 8:
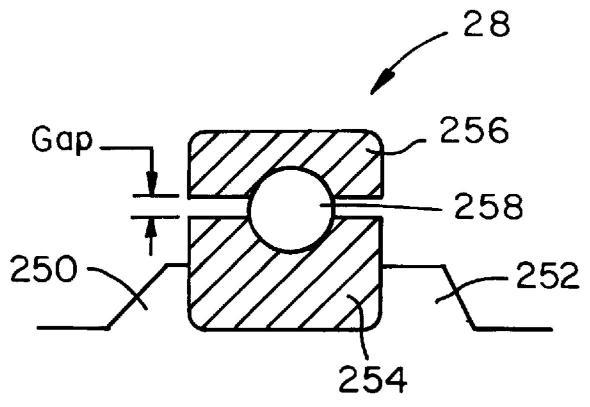
FIG. 8 is an enlarged view of the radial bearing fixed in place on the integral slip ring.

Refer now to FIG. 5 where an insert 110 is illustrated that is constructed in accordance with the principles of the present invention. An entire slip ring assembly 200 manufactured according to the present invention is depicted in FIG. 8, which is described in detail below. For convenience, the invention will be described in relation to the orientations depicted in FIGS. 4–8, and consequently, terms such as "left" and "right", as used herein, are to be construed in the relative sense. It should be understood that the present invention is usable in any orientation. The present invention differs from the prior art in that there is an integral bearing that is used in a slip ring. Consequently, the description provided above with respect to the prior art is applicable here. The slip ring assembly 200, once assembled, is inserted into a pair of brush blocks 14 and then into housing 16 and operates in a known manner.

The manufacturing process used in the present invention is known as insert molding. In this type of process certain components are inserted into a mold and then the mold is filled with plastic material. The components to be insert molded are positioned in the mold, the mold is held closed and molten plastic is forced into the mold and around the components that are positioned in the mold and a one-piece assembly is ejected from the mold.

Figure 1:
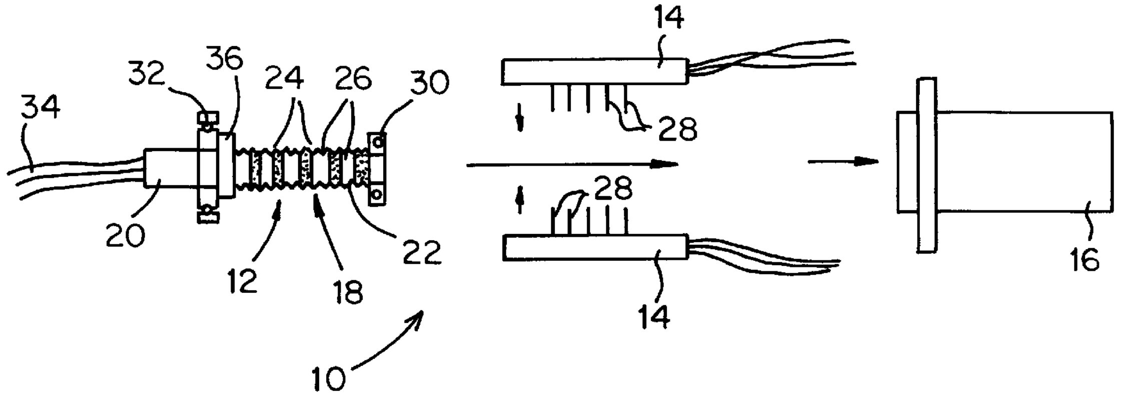
FIG. 1 PRIOR ART
FIG. 1 is an exploded elevational view of a prior art capsule assembly.
Figure 2:
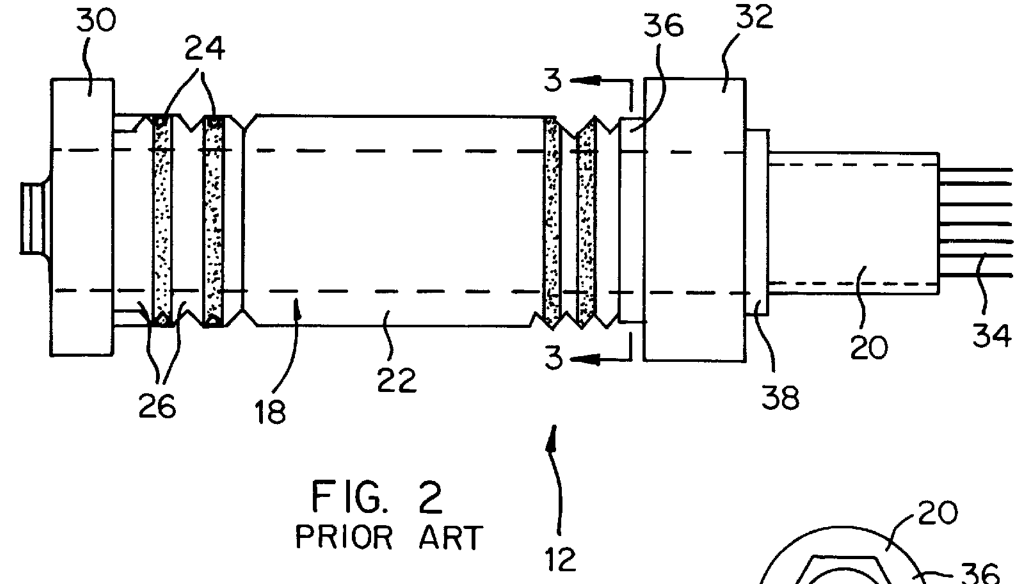
FIG. 2 PRIOR ART
FIG. 2 is an enlarged view of the slip ring assembly of FIG. 1 with the backshaft bearing retained on the backshaft of the slip ring by a retaining clip.
Figure 3:
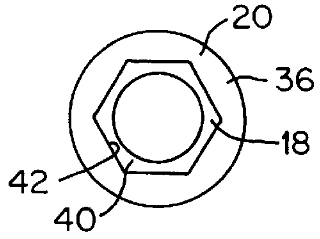
FIG. 3 PRIOR ART
FIG. 3 is an cross-sectional end view showing the backshaft member joined to the ring member of the prior art slip ring assembly.
Figure 4A:
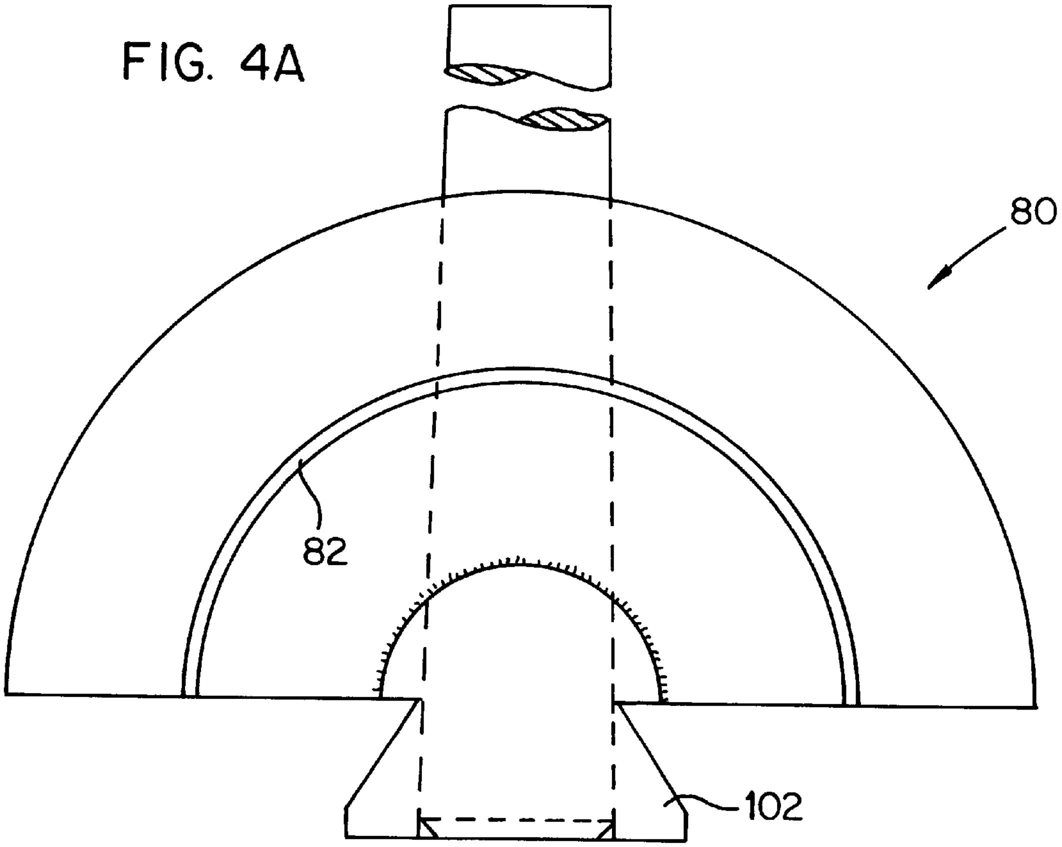
FIG. 4A us a cross-sectional view taken along line 4A—4A in FIG. 4.
Figure 4:
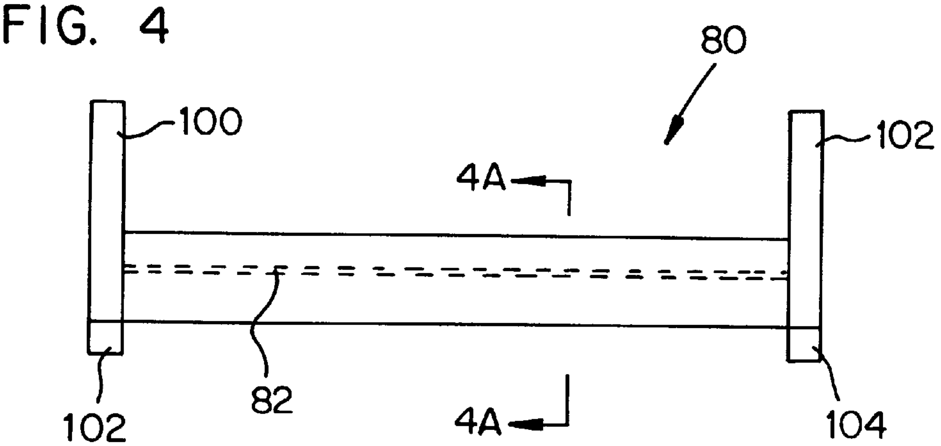
FIG. 4 is a side elevational view of a mandrel used in the molding process to form a plastic insert.

To manufacture the slip ring assembly 200 according to the present invention, a first a pair of inserts 110 are molded in a first mold (not shown) with a mandrel 80. The molded insert 110 is depicted in FIG. 5. The mandrel 80 depicted in FIGS. 4 and 4A has a semi-circular recess 82 and two end portions 100, 102. The two end portions have dovetail portions 102, 104 extending downwardly from the recess 82 and upstanding portions which extend upwardly from the recess 82. The dovetail portions 102, 104 advantageously position and align and position the mandrel 80 within the first mold. These inserts 110 will later be discarded but are used during the molding process to prevent plastic material from flowing into the race of the inserted bearing. Preferably the inserts 110 are identical and are preferably made from a Ryton PPS material (or other material) which has a melting temperature of approximately 630° F. (or a higher melting temperature material). The insert 110 is injection molded through a pair of gates 112 or a single gate which may be semicircular in cross section. A semicircular front portion cavity 114 is formed during the injection molding process that is adjacent to a front bearing cavity 116 that is semicircular in section. Adjacent front bearing cavity 116 is a semicircular elongated ring portion cavity 118 that defines a plurality of ring receiving portions 120. Each of the ring portions 120 is parallel to the adjacent ring portion 120. A semicircular bearing portion 122 is located at an end of ring portion cavity 118. A flange portion 124, having a smaller diameter than bearing portion 122, is adjacent to the bearing portion 122. A semicircular back shaft portion 126 is adjacent to flange portion 124 and is elongate and of smaller diameter than the flange portion 124. A semicircular wire receiving portion 128 is of smaller diameter and has an open end 130.

Figure 6:
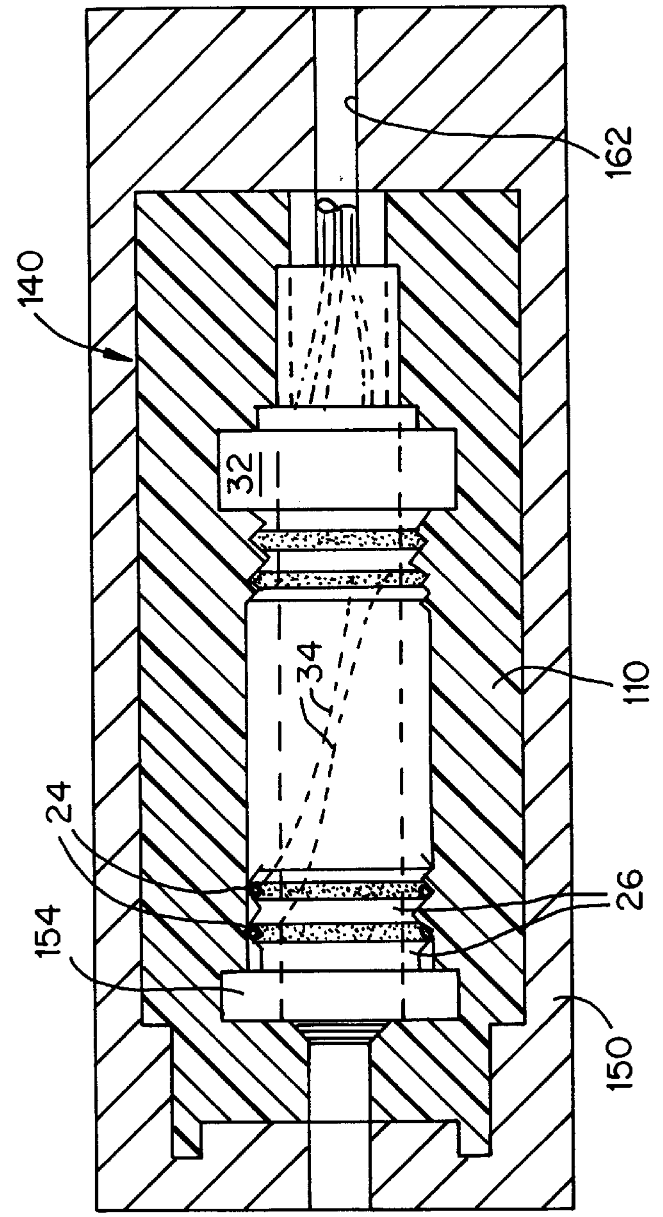
FIG. 6 is a top plan view of the slip ring bearing assembled in a mold prior to injection molding.

The pair of inserts 110 is used to form an insert assembly 140 as depicted in FIG. 6. The process for assembling an insert assembly 140 is performed as follows. All of the inserts are placed into one of the two inserts 110. A plurality of rings 22 are each placed into a respective one of the ring portions 120 in the one of the inserts 110. As is known, the rings 22 can be made from either copper or brass or other electrically conductive materials. The wires 34 are usually attached to the rings 22 before the rings 22 are placed in the mold. An annular boss insert 154 is placed into front bearing cavity 116. The boss insert 154 is metallic and has a central round aperture (not shown). The boss insert 154 is used to prevent plastic from flowing into the front bearing cavities 116. Bearing 32 is placed into bearing cavity 122. The bearings 30 and 32 can be radial ball bearing or a bushing such as a plastic material that has molded in lubricity. Bearing cavities 122 must be precisely sized so that plastic material does not enter into the race of the bearing 32. Wires 34 are inserted through a central opening in bearing 32 and ends thereof extend into and past wire receiving portion 128 of the insert 110. The wire receiving portion 128 is sized to slightly compress the wires 34 so that plastic material cannot flow past the wires 34. The plastic material will encapsulate the wires 34. A second insert 110 is placed on the first insert 110 and each of the rings 24, bearing 32 and boss insert 154 placed into the first insert is secured into a corresponding portion in the second insert 110. Usually many insert assemblies 140 will be completed before the molding process is started.

The completed insert assembly 140 is then placed into one half of a mold 150. A semicircular bore 162 extends through mold 150 on one end thereof. The ends of wires 34 are placed into the bore 162. The other half of the mold 150 can then be closed.

The next step in the process is to injection mold material into the mold 150. The preferred material is a liquid crystal polymer having a lower melting temperature than the Ryton inserts 110. After being removed from the mold 150, because the Ryton inserts 110 are not encapsulated by the plastic, the inserts 110 can be removed. The Ryton inserts 110 can either be reused or ground and reused in a conventional manner. The end boss insert 154 is removed and a bearing 30 replaces end boss insert 154. Advantageously, as depicted in FIG. 7, the wires 34 are encapsulated and retained by a slip ring body 202.

Figure 7:
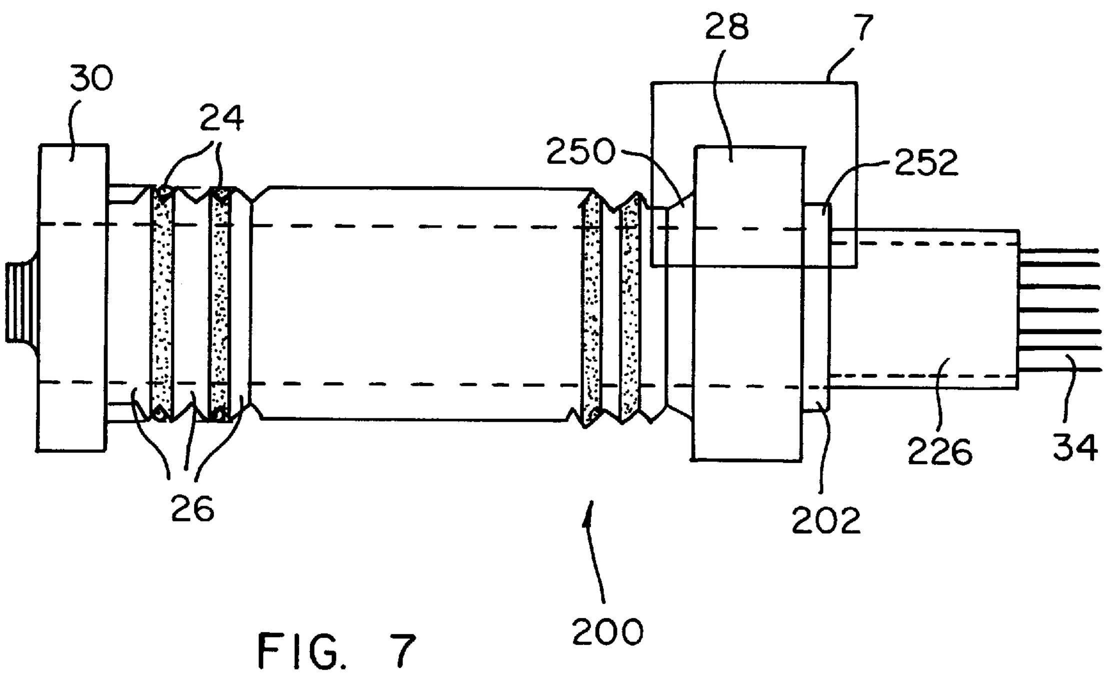
FIG. 7 is a side elevational view of a complete slip ring assembly according to the present invention.

The completed slip ring 200 is depicted in FIG. 7. The slip ring 200 has rings 24 separated by radially extending portions 26. The front bearing 30 and backshaft bearing 32 are depicted as being different bearings but these bearings can be the same bearing but in different locations. For example, bearing 32 could be a radial ball bearing and the front bearing 30 could be a bushing. A backshaft portion 226 is integral to the body 202. A flange portion 252 is depicted to the right of the bearing 32.

If a radial bearing is used as bearing 32, it is very important in the present invention that no molding material be placed into the inner race of bearing 32. As depicted in FIG. 8, bearing 32 includes an inner race 254, and outer race 256 and a plurality of roller ball bearings 258. Returning to FIG. 5, bearing cavity 122 is precisely sized so that the ball bearing 32 is protected during molding. Bearing cavity 122 has a pair of shoulders 136, 138 that extend inwardly past a gap between inner race 254 and outer race 256 as depicted in FIG. 8. In this manner, during the injection molding process, molten plastic material is prevented from entering into the gap. If molten plastic material were to enter the gap, the ball bearing 32 would be rendered unusable. Shoulders 136 and 138 may extend inwardly the same distance or may extend different distances. In either event, a front flange 250 is formed and the rear flange 252 is formed which compress opposite outer surfaces of inner race 254 as depicted in FIG. 8. In this manner, axial movement of the bearing 32 is prevented or minimized.

The completed slip ring 200 according to the present invention can be placed into a pair of brush blocks 14 and into a housing 16 as previously described. Advantageously, the slip ring 200 is less expensive to manufacture and prevents axial movement of the bearing 32. The body 202 is more durable than prior art constructions because the body 202 is fabricated in one-piece and encapsulates the wires 34 without the necessity to pot the wires 34.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. An integral slip ring assembly, comprising:

a slip ring body having a slip ring section, a backshaft section and a bearing mounting section therebetween;

a first bearing mounted in said bearing mounting section wherein said slip ring body has opposed bearing retaining walls which capture said bearing and prevent axial movement of said bearing; and slip rings positioned in said slip ring section and at least one wire attached to each said slip ring.

2. The slip ring of claim 1, wherein the slip ring body is injection molded of a liquid crystal polymer.

3. The slip ring of claim 1, further comprising a second bearing press fit onto said slip ring body.

4. The slip ring of claim 1, wherein said slip ring body is one piece.

5. The slip ring of claim 1, wherein said bearing is a radial bearing.

6. The slip ring of claim 1, wherein said bearing has an inner race, an outer race and a plurality of ball bearings, said inner race extending radially outwardly beyond said opposed bearing retaining walls.

7. The slip ring of claim 1, wherein the bearing is a bushing.

8. The slip ring of claim 1, wherein the bushing is a plastic having molded in lubricity.

* * * * *